Figure 1:
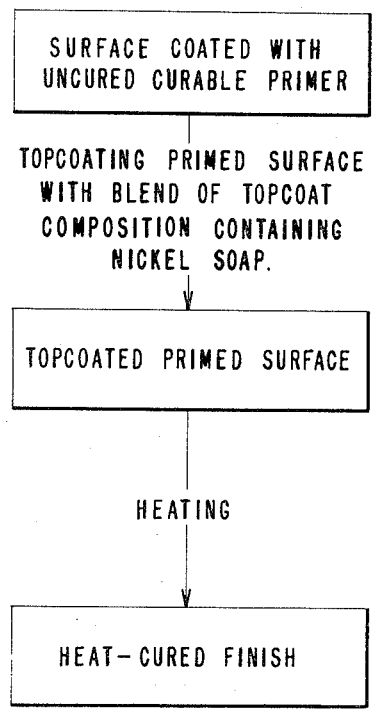

Jan. 11, 1966     W. A. HAUBERT     3,228,787
HEAT CURABLE TOP-COATING COMPOSITION
Filed Dec. 20, 1961

INVENTOR
WILLIAM A. HAUBERT

BY

ATTORNEY

United States Patent Office 3,228,787
Patented Jan. 11, 1966

3,228,787
HEAT CURABLE TOP-COATING COMPOSITION
William A. Haubert, Toledo, Ohio, assignor to E. I. du Pont de Nemours and Company, Wilmington, Del., a corporation of Delaware
Filed Dec. 20, 1961, Ser. No. 161,775
16 Claims. (Cl. 117—75)

This invention relates to heat-curable topcoat coating compositions containing an effective small proportion of a hydrocarbon soluble nickel soap sufficient to inhibit undercoat vehicle bleed-through into the topcoat when applied wet over an uncured alkyd-resin-based undercoat characterized as normally exhibiting bleed-through of the vehicle into the topcoat in the absence of the nickel soap. More particularly, the invention relates to a composite coating or finish having a drying oil alkyd-resin-based primer layer, characterized in the uncured state as normally exhibiting vehicle bleed-through into a superimposed topcoat layer applied wet thereto, and a heat-curable topcoat layer, contiguous with the primer layer, containing an effective small proportion of hydrocarbon-soluble nickel soap in an amount sufficient to inhibit the undercoat vehicle bleed-through, the composite coating being cured by heating in the absence of precuring the undercoat; and to a sheet metal article having this composite coating as a decorative and/or protective finish thereon. The invention further relates to a method of inhibiting undercoat vehicle bleed-through in composite finishes comprising drying oil-modified, alkyd-resin-based primer and a contiguous superimposed layer of heat-curable topcoat composition, the composite finishes being heat-cured subsequent to topcoat application over uncured primer.

Bleeding or bleed-through as referred to herein is not to be recognized as a contribution of bleeding pigments, the pigments used in undercoats, e.g., primers and primer-surfaces, ordinarily being non-bleeding and of inorganic oxide composition and usually in combination with silicate pigments. The characteristic of bleed-through as referred to herein is attributed to transfer of organic material from the undercoat and any color contribution it may provide as a result of extraction by the liquid topcoat composition applied wet over the uncured undercoat. Such transfer or in situ intermixing of organic film-forming material of the undercoat with the topcoat composition applied at ordinary coating thickness causes a non-uniform appearance and off-color in the resulting composite finish.

While curing of the alkyd-resin-based undercoats prior to application of the heat-curable topcoat composition generally inhibits extraction of the organic film-forming material of the undercoat by the liquid topcoat composition as a result of altering the solubility characteristics by heat-conversion, particularly when the undercoat composition includes a heat-curable aminoplast coating resin, precuring of the undercoats is undesirable aside from the cost of subjecting the over-all finish to an undercoat heat cure plus a heat-cure for the topcoat superimposed over the cured undercoat. Over-baking of the undercoat by the combined heat-curing of the primer plus the heat-curing of the superimposed topcoat may produce undesirable characteristics in the finish, e.g., intercoat adhesion may be adversely affected. It is well recognized that undercoat as well as topcoat compositions are formulated to conform with certain ranges of contemplated curing conditions and consequently the components of a composite finish system designed for single bake or heat-cure of a topcoat composition superimposed on an uncured undercoat are ordinarily formulated differently than if the undercoat is to be separately cured under its own peculiar heat-curing conditions and must tolerate the subsequent heat-curing condition peculiar to the applied topcoat.

It is known to include certain compounds of nickel, e.g., colloidal hydrous nickel oxide and nickel salts of half ester acid phthalates, in organic coating compositions, particularly clear formulations, to enhance the durability of the coating on exposure to the weather. It is also known to use certain nickel soaps in combination with soaps and other soluble organic derivatives of metals, e.g., lead, cobolt and manganese, recognized as metal driers in coating compositions formulated with organic film-forming materials which ordinarily cure or dry through metal drier initiation.

It is now found surprisingly that a hydrocarbon-soluble nickel soap, preferably a nickel soap of a $C_6$ to $C_{12}$ saturated aliphatic monocarboxylic acid, e.g., nickel octoate, nickel caprylate, or nickel-2-ethylhexoate, blended in an effective small proportion with a heat-curable topcoat composition having, as the essentially organic film-forming components thereof, at least one fatty acid modified alkyd resin, preferably modified with the fatty acids of non-drying vegetable glyceride oils, and at least one lower alkanol-modified aminoplast coating resin in solution in a mutual solvent therefor comprising an aromatic hydrocarbon solvent, provides inhibition of undercoat bleed-through when the topcoat composition so modified with the soluble nickel soap is applied over uncured alkyd-resin-based undercoat having an organic film-forming composition extractable by the liquid topcoat composition to normally cause undercoat bleed-through. An effective proportion of the hydrocarbon-soluble nickel soap usually is an amount equivalent to from about 0.075% to about 0.3% by weight of nickel metal based on the total weight of the liquid topcoat coating composition. However, a proportion of nickel soap equivalent to as little as 0.05% nickel on the indicated basis provides a detectable improvement in the composite finish, although bleed-through may not be completely remedied. A proportion of nickel soap in excess of that equivalent to 0.3% of nickel may be used if it is desirable to take advantage of the contribution of nickel soaps to the durability of the topcoat composition, i.e., to enhance resistance of the finish to deterioration on exposure to the weather. Ordinarily, nickel soaps are deeply colored and consequently the presence of proportions of the soap significantly in excess of 0.3% as nickel provides a significant color contribution to white and light tint coating compositions. Another disadvantage of proportions of nickel soap in excess of the suggested upper limit is that such proportions tend to retard the cure of the topcoat.

Nickel soaps are commercially available and may have a nickel content in the range of 2% to 12% by weight, the soap usually being in solution in a hydrocarbon solvent. Although useful nickel soaps may be the reaction product of the soap-forming components in stoichiometric proportions, the soaps generally contain an excess of the soap-forming carboxylic acid which may be in proportions up to 50% excess of the stoichiometric amount.

Preferably, the excess amount of soap-forming acid is in the range of about 5% to 30% by weight of the stoichiometric amount. Hence, in the description of this invention, the term nickel soap defines nickel carboxylate compositions containing up to 50% excess of the stoichiometric amount of soap-forming carboxylic acid, the proportion of acid preferably being no greater than 30% excess. The soap-forming acid component reacting to form the nickel carboxylate and providing the excess carboxylic acid may be one or more $C_6$ to $C_{18}$ aliphatic monocarboxylic acids, tall oil fatty acids, hydrogenated fatty acids, rosin acids, and naphthenic acid. The aliphatic monocarboxylic acids may be straight-chain or branched-chain, acyclic or cyclic, saturated or olefinically unsaturated. When olefinic unsaturation is present in the monocarboxylic acid, it is preferably monoolefinic unsaturation. Preferably, the soap-forming acid is an acyclic saturated aliphatic monocarboxylic acid having only carbon atoms, hydrogen atoms and oxygen atoms in the molecular composition thereof, i.e., the radical joined to the carboxyl group preferably is a hydrocarbon radical. The acid molecule may include a hydroxyl substituent as in ricinoleic acid. The total number of carbon atoms in the soap-forming acid preferably is from 6 to 12. Typical species of useful, substantially water-insoluble soap-forming fatty acids are:

Hexanoic acid (caproic)
2-Ethylbutanoic acid
Heptanoic acid
Octanoic acid (caprylic)
2-Ethylhexanoic acid
Nonanoic acid (pelargonic)
Decanoic acid (capric)
Hendecanoic acid
Dodecanoic acid (lauric)
Tetradecanoic acid (myristic)
Hexadecanoic acid (palmitric)
Octadecanoic acid (stearic)
9-Octadecenoic acid (oleic)
9,12-Octadecadienoic acid (linoleic)
9,12,15-Octadecatrienoic acid (linolenic)
12-Hydroxy-9-octadecenoic acid (ricinoleic)

The acids may be used as individual species or as a mixture of species, e.g., mixed acids in the proportions in which they occur naturally in glyceride vegetable oils. Acid mixtures derived from non-drying natural occurring glyceride oils are preferred over acid mixtures derived from natural occurring drying type glyceride oils.

Topcoat formulations to which the nickel soap is added effectively comprise a heat-curable lower alkanol-modified aminoplast coating resin and a fatty acid-modified alkyl resin, preferably fatty acids of non-drying glyceride oils, as the essential organic film-forming materials in a solution in a mutual solvent therefor, comprising an aromatic hydrocarbon solvent. The formulation is ordinarily pigmented with paint pigments insoluble in the solution of the organic film-forming materials, preferably with durable non-bleeding inorganic pigments. The oil-modified alkyd resin preferably constitutes a preponderant proportion of the organic film-forming components of the topcoat formulation. The weight ratio of the alkyd resin ordinarily is in the range of 1 to 20 parts of alkyd resin per part of the aminoplast coating resin, i.e., 100 parts of the alkyd/aminoplast resin combination ordinarily contains from about 5 parts to about 50 parts of the aminoplast resin. In some instances the proportion of aminoplast may be as low as 3 parts on the indicated basis in providing an effective contribution. Preferably, the proportion of the aminoplast coating resin is in the range from about 15 parts to about 40 parts per 100 parts of the alkyd/aminoplast resin combination.

The alkyd resin component is oil-modified, preferably with pendant carboxylate groups from monocarboxylic fatty acids found in the non-drying glyceride oils, e.g., coconut oil, castor oil, cottonseed oil, and corn oil, these oils or oil acids hydrogenated to reduce the unsaturation. The monocarboxylic fatty acid mixtures of these oils are composed preponderantly of saturated species and mono-olefinically unsaturated species. These acid mixtures ordinarily include a minor proportion of acids having a plurality of olefinic linkages, primarily dienoic, e.g., linoleic acid.

Carboxylates of these fatty acids are chemically bound in the alkyd resin structure, i.e., bound to the resin-forming polyol of the alkyd resin. For example, the fatty oils, i.e., glycerol triesters, are reacted with additional glycerol or other polyol to form the mono-esters of the respective monocarboxylic fatty acids, the resulting monoglycerides are reacted with a dicarboxylic acid, e.g., phthalic acid or anhydride, to form the linear resin molecule having the radicals of the monocarboxylic acids as pendant substituents.

For convenience in expressing this fatty acid carboxylate modification of the alkyd resin, the proportion of fatty acid is reported ordinarily on the basis of an equivalent amount of triester of glycerol, i.e., glyceride oil. On this basis, the oil modification of the alkyd resin ordinarily is in the range of 20% to 50%, preferably 25% to 45%, by weight of the modified alkyd resin. In some instances, the modifying glyceride oil may be up to 55% by weight of the alkyd resin.

As is well recognized in the resin art, a wide variety of polyols and dicarboxylic acids or anhydrides thereof can be used as the polyester-forming components in the preparation of the alkyd resin. The polyester-forming reactants are in substantially equivalent stoiciometric proportions with a slight excess of the polyol being used to minimize the acid number of the alkyd resin, this excess polyol providing the resin with pendant hydroxyl substituents. Unesterified hydroxyls in the alkyd resin molecule are ordinarily reported equivalently as glycerol, sometimes referred to as excess glycerol, or in terms of other polyols which may be used. Glycerol, pentaerythritol, trimethylolethane, trimethylolpropane and ethylene glycol are typical polyols used in alkyd resin preparation.

The benzenedicarboxylic acids, i.e., phthalic, isophthalic and terephthalic, the alpha, omega aliphatic dicarboxylic acids having four to ten carbon atoms per molecule, e.g., succinic, adipic, pimelic, suberic, azelaic, sebacic and isosebacic, maleic and fumaric, are typical dicarboxylic acids which may be used in the preparation of the alkyd resin. It will be recognized that monoesters of tricarboxylic acids with fatty monohydric alcohols can be used to provide the alkyd resin with pendant carboxylate radicals of the fatty alcohol. The art further teaches that the alkyd resin may be modified further with other monofunctional reactants to provide still different pendant radicals, benzoic acid and p-tertiarybutyl benzoic acid being typical. Alkyd resins having ethylenic unsaturation may be copolymerized with styrene to provide styrenated alkyds or with an ester of acrylic acid or of methacrylic acid, e.g., to provide methacrylated alkyd resins.

The resin-forming components are condensed together until the resulting soluble resin has the desired specifications for coating use. The processing may be by fusion technique or by solution technique in the presence of a solvent for the alkyd resin. The viscosity of the resulting resin may range from Gardner-Holdt "A" for a 70% solution of the resin at 25° C. to about Z–4 for a 50% solution at 25° C., the acid member of the alkyd resin preferably being not significantly greater than about 20 and the unreacted hydroxyl content preferably being not significantly greater than about 10% glycerol equivalent.

Combinations of non-drying oil-modified alkyd resins are used to provide a balance of properties. For example, coconut oil-modified alkyd resin may be used in combination with castor oil or hydrogenated castor-oilmodified alkyd resin. Alternatively, such alkyd resin combinations may be substantially duplicated by a single alkyd resin having an equivalent combination of coconut oil and castor oil or hydrogenated castor-oil modifying the resin. The combination of coconut-oil-modified alkyd resin and castor-oil-modified alkyd resin is especially preferred in the topcoat formulation, the relative proportions usually being in the range equivalent to from 0.33 to 3 parts of modifying castor oil per part of modifying coconut oil, preferably 0.4 to 1.5 parts, i.e., of the combination of modifying fatty acid carboxylates, usually 25% to 75%, preferably about 30% to 60%, by weight is castor glyceride oil and complementally 75% to 25% usually is coconut glyceride oil, preferably 70% to 40%.

Water-immiscible solvents, e.g., hydrocarbon solvents, are ordinarily used as the solvent for the alkyd resin. The hydrocarbon solvent usually is of the high solvency aromatic type, e.g., toluol, xylol, and high solvency petroleum naphthas having a high aromatic content. These high solvency diluents may be in combination with other hydrocarbons, e.g., mineral spirits and V. M. & P. naphtha, to obtain a balance of properties such as rate of evaporation. These hydrocarbon solvents of the type used in paint and enamel formulations ordinarily have a boiling range within the limits of from about 80° C. to about 250° C., a preponderant proportion having a distillation temperature below 200° C. The solvent mixture may include polar solvents in combination with the hydrocarbon solvents, e.g., the lower alkanols. Other solvents and diluents ordinarily found in coating compositions may be included in the solvent mixture, e.g., ester, ketones, ether alcohols, when these materials provide an advantageous contribution. Ordinarily these ancillary solvents are not economically competitive with the aromatic hydrocarbon solvents and high solvency petroleum naphthas. The topcoat formulations ordinarily include at least 30% by weight of volatile solvent and ordinarily contain at least 50% of volatile solvent at spraying consistency.

The aminoplast coating resin of the topcoat formulation is a heat-curable soluble condensate of formaldehyde with one or more amino compounds having a plurality of amine groups, e.g., urea, melamine, and benzoguanamine, modified with a lower alkanol having up to 8 carbon atoms to form alkoxy groups by reaction with methylol groups of the amine/formaldehyde condensate. These condensates are prepared by well known techniques by reacting the aforementioned amino compounds singly or as mixtures thereof with formaldehyde and a lower alkanol, preferably butanol, or reacting methylol-substituted derivatives of such amino compounds with the lower alkanol. The proportion of alkanol usually is in excess of the amount necessary to etherify all of the methylol groups of the aminoformaldehyde condensate.

In addition to the essential components of these amine/formaldehyde/alkanol condensates, they may contain minor proportions of amino modifiers such as for example, polyamines and arylsulfonamides. Useful condensates of this aminoplast resin class are commercially available in solution form under the tradenames "Beetle," "Beckamine," "Melmac," "Plaskon," "Resimine" and "Uformite" which are designated as coating resins for baking finishes. These resin solutions ordinarily are supplied at a resin content in the range of 50% to 70% by weight dissolved in a suitable solvent comprising a lower alkanol and generally including an aromatic hydrocarbon solvent, e.g., xylol or toluol, in combination with the alkanol. A mixture of alkanol-modified urea/formaldehyde resin with alkanol-modified melamine/formaldehyde resin or alkanol-modified benzoguanamine/formaldehyde resin is preferred as the aminoplast resin component of the topcoat formulation, the proportion of the urea/formaldehyde condensate usually being 50% to 80% of the mixture of aminoplast resins, the modifying alkanol preferably being butanol.

The topcoat formulation may be a clear unpigmented composition, but it ordinarily includes pigment. Useful pigments are of the class commonly used in the formulation of enamels, paints and lacquers and these are used in proportions ordinarily specified in such formulations, i.e., in the range of up to about 200% based on the weight of the organic film-forming material. Suitable pigments include metal oxides, hydroxides or hydrous oxides, chromates, silicates, sulfates, sulfides and carbonates, carbon black, organic dyestuffs and lakes thereof which are insoluble in the solvents and organic film-forming material such as not to cause bleeding, and lamellar pigments such as mica and metal flakes such as aluminum. Inasmuch as the invention is concerned with inhibiting bleed-through from the undercoat, it will be obvious that high proportions of high hiding pigments and dark colored pigments tend to obscure the undercoat bleed-through. Consequently use of the nickel soap is most advantageous in white pigmented topcoat compositions or light tints, and in clears or substantially transparent topcoat finishes. It will be recognized that in clears and transparent coatings, the presence of the soluble nickel soap itself may introduce a significant color contribution to the coating. Pigment in the topcoat formulation is present ordinarily in a proportion not significantly greater than about 100% based on the weight of the organic film-forming material, and for end uses where optimum durability and gloss are important, the pigment content preferably is not significantly greater than 60% in the indicated basis.

The topcoat formulation may include other ancillary components such as anti-settling agents, dispersing agents, bodying agents, polymethylsiloxane fluid for control of surface characteristics, plasticizers and modifying resins, e.g., castor oil, blown castor oil, dibutyl phthalate, tricresyl phosphate, epoxyhydroxypolyether resins of the type which are condensates of a dihydric phenol with epichlorohydrin or fatty acid esters of such epoxy resins.

The undercoat component of the composite coatings of this invention are ordinary primer and primer-surfacer compositions based on a drying oil-modified alkyd resin and usually including a minor proportion of an aminoplast coating resin, e.g., from about 2% to about 25% of the organic film-forming material, and usually containing a substantially high ratio of pigment, e.g., up to 200 parts of pigment per 100 parts of organic film-forming material. The proportion of pigment is generally higher than that of the superimposed top-coat compositions.

Undercoats are usually applied at a coating thickness in the range of 0.4 to 1.5 mils and superimposed coats ordinarily are applied at sufficient thickness to provide additionally about 0.5 to 2 mils. The composite coating preferably has a dry thickness in the range of from about 1 mil to 2.5 mils, with the topcoat preferably providing at least half of the total coating thickness.

Undercoats and topcoats may be applied by any ordinary technique, e.g., spraying, dipping, roller coating, and brushing. The utility generally dictates the application technique. Inasmuch as the invention is concerned primarily with application of topcoat over uncured or substantially uncured undercoat and heat-curing of the composite coating as a single unit, curing conditions suitable for the composite apply. Any processing conditions for effecting adequate cure of the topcoat per se are ordinarily adequate for curing the composite coating. Heat-curing is ordinarily carried out under conditions equivalent to heating for about 30 minutes at a temperature in the range of 225° F. to 325° F., heating for 60 minutes at 210° F. being suitable.

Figure 2:

A drawing is included wherein FIGURE 1 is a flow sheet of the process of the invention and FIGURE 2 is a representation of the multiple coated article produced thereby.

The following examples are intended to illustrate but not to limit the invention. All parts and percentages are given on a weight basis unless otherwise indicated.

EXAMPLE 1

Primer-surfacer formulation—first portion:  Parts by weight
- Soya oil alkyd resin A—55% solution _____ 55
- Hydrocarbon solvent 1—B.R. 175°–233° C.; A.P. 4° C. _____ 129
- Soya lecithin solution—50% in hydrocarbon solvent _____ 4
- Cresol inhibitor solution—10% in hydrocarbon solvent _____ 5
- Gilder's whiting _____ 170
- Zinc oxide—American process _____ 40
- Iron oxide—Domestic oxide, about 74% $Fe_2O_3$ _____ 168
- Zinc chromate—Zinc yellow Y–539–D _____ 17

Second portion:
- Soya oil alkyd resin B—60% solution _____ 316
- Butanol-modified urea/formaldehyde resin—60% in butanol _____ 42

Third portion:
- Hydrocarbon solvent 2—B.R. 88°–142° C.; A.P. 55° C. _____ 30
- Toluol _____ 24

_____
1000

Soya alkyd resin A is 43% oil length soya oil-modified glyceryl phthalate alkyd resin at 55% concentration in a 65/35 weight mixture of hydrocarbon solvents 3 and 4 which are high solvency petroleum naphthas. This resin solution has a viscosity of about Z on the Gardner-Holdt scale at 25° C. The alkyd resin A is characterized by an acid number of about 6 and a hydroxyl value equivalent to about 5% excess glycerol. Hydrocarbon solvent 3 is characterized by a boiling range (B.R.) of 130° to 195° C. and an aniline point (A.P.) of 13° C. Hydrocarbon solvent 4 is characterized by a boiling range of 150° to 190° C. and an aniline point of −28° C.

The soya lecithin solution at 50% concentration in a 90/10 weight mixture of mineral spirits and the described hydrocarbon solvent 2. The mineral spirits is characterized by a boiling range of 145° to 215° C.

The cresol inhibitor solution is at 10% concentration in the 90/10 mixture of mineral spirits and high solvency petroleum hydrocarbon solvent 2.

Soya oil alkyd resin B is 52% oil length soya oil-modified glycerol phthalate alkyd resin at 60% concentration in a solvent mixture of 60 parts of mineral spirits and 40 parts of high solvency hydrocarbon solvent 2. This resin solution has a viscosity of about Z on the Gardner-Holdt scale. This alkyd resin B is characterized by an acid number of about 5 and a hydroxyl value equivalent to about 2.5% of excess glycerol.

The butanol-modified urea/formaldehyde resin is the butyl ether of a methylolurea condensate prepared following the teachings of U.S. Patent 2,191,957. The resin solution at 60% concentration in butanol ordinarily contains 3% to 4% of water and is characterized by a viscosity in the range of 1500 to 3000 centipoises at 25° C.

The components of the first portion are blended together and ground in a ball mill using steel balls for about 48,000 cycles. The components of the second portion are blended with the ground first portion, and the third portion is blended with the mixed prior portions. The resulting primer composition is characterized by a viscosity ordinarily in the range of 23 to 29 seconds, #10 Du Pont cup at 25° C. While the primer may be applied at this viscosity for spray application, it is ordinarily thinned in the proportions of 100 parts of primer composition and 15 to 20 parts of toluol, xylol, or high solvency petroleum naphtha such as the described hydrocarbon solvent 3.

Topcoat enamel formulation.—First portion:  Parts by weight
- Coconut oil-modified alkyd resin C—60% in xylol _____ 65
- V. M. & P. Naphtha _____ 42
- Titanium Dioxide Pigment _____ 182

Second portion:
- Coconut oil-modified alkyd resin C—60% in 10° xylol _____ 165
- Castor oil-modified alkyd resin D—55% solution _____ 228

Third portion:
- Butanol-modified urea/formaldehyde resin—60% in butanol _____ 111
- Butanol-modified melamine/formaldehyde resin—55% in butanol _____ 66
- Butanol _____ 47

Fourth portion:
- Nickel octoate—10% nickel in xylol _____ 10

Fifth portion:
- High solvency hydrocarbon solvent 4—B.R. 150°–190° C.; A.P. −28° C. _____ 78
- Toluol _____ 6

_____
1000

The coconut oil-modified alkyd resin C is characterized by the following empirical composition for the resin solids on a weight basis:

| | Parts |
|---|---|
| Coconut oil | 29.7 |
| Glycerol tertiary butyl benzoate | 9.9 |
| Pentaerythritol tertiary butyl benzoate | 9.9 |
| Glycerol phthalate | 22.4 |
| Pentaerythritol phthalate | 22.4 |
| Hydroxyl content as pentaerythritol | 5.7 |
| | 100.0 |

The resin is further characterized as having an acid number of about 5 and a solution viscosity of about X at 25° C. for the 60% solution in xylol.

The castor oil-modified alkyd resin D is characterized by the following empirical composition for the resin solids on a weight basis:

| | Parts |
|---|---|
| Castor oil | 40.0 |
| Glyceryl phthalate | 53.2 |
| Hydroxyl as glycerol | 6.8 |
| | 100.0 |

This resin is in solution at 55% concentration in a mixed solvent consisting of 90 parts high solvency petroleum naphtha 4, 10 parts of 10° xylol and 10 parts of butanol. This resin solution at 25° C. has a viscosity of about Z–3. The acid number is about 5.

The butanol-modified urea/formaldehyde resin is as described for the primer formulation. The butanol-modified melamine/formaldehyde resin solution is characterized by a viscosity in the range of about 400 to 700 centipoises at 25° C. at 55% resin concentration, the solution having a water content no greater than 3%.

The nickel octoate is the nickel soap of caprylic acid, i.e., $C_8$ saturated aliphatic monocarboxylic acid, having a nickel content of 10% and a soap content of 67% in solution in xylol, approximately 20% of caprylic acid in excess of the stoichiometric amount.

In addition to the described essential components of the topcoat formulation, ancillary components, e.g., anti-settling agents for inhibition of pigment settling, wax dispersions for improvement of abrasion resistance, polymethyl siloxane fluid for modification of the surface properties of the coating and colored tinting pigments for tinting the white enamel to match an established color standard may be present in the composition in small proportions sufficient to provide an effective contribution to the composition.

The ingredients of the first portion are blended together and milled to disperse the pigment. Any of the dispersion techniques used ordinarily in paint and enamel preparation can be used. The said grinding technique described in U.S. Patent 2,581,414 is particularly effective for preparing the pigment dispersion defined by the first portion. The ingredients of the second portion are blended with the dispersion of the first portion. The ingredients of the third portion are blended with the combined prior two portions. Then the fourth portion is blended into the composition and finally the solvents of the fifth portion are blended into the composition. Tinting is usually accomplished by including small proportions of tinting colors in the fifth portion.

The primer-surfacer composition is thinned for spraying in the proportion of 100 parts plus 20 parts by weight of toluol and the topcoat composition is thinned 100 parts plus 10 parts of toluol.

The primer-surfacer is sprayed on Bonderized sheet metal body panels of a Chevrolet truck in an amount sufficient to provide a dry coating thickness of 0.8 to 1 mil, and the primer-coated panels are permitted to air-dry at an ambient temperature of about 70° F. for about 1 minute. Then the topcoat composition containing the nickel soap is sprayed over the superficially dry uncured primer-surfacer in an amount sufficient to provide from about 1 mil to 1.5 mils of dry coating thickness of topcoat enamel. After air-drying for 15 minutes, the coated panels having a composite coating of uncured heat-curable primer-surfacer and uncured heat-curable topocat are heated for 30 minutes at 300° F.

A comparative panel is prepared having the same composite coating applied and processed under the same conditions except that the comparative topcoat enamel used differs from the Example 1 topcoat formulation only in respect to substitution of an equal weight of xylol for the nickel octoate solution specified in the fourth portion thereof.

The resulting comparative panel having the cured comparative composite finish exhibits non-uniform appearance and is discolored in reference to both the cured composite coating of Example 1 and color standards prepared by applying the topcoat enamel to an unprimed metal panel and directly to a glass plate panel and processing under the same conditions. The cured composite finish of the Example 1 formulations containing nickel soap in the topcoat enamel is free of non-uniformity in appearance and matches the color not only of the Example 1 topcoat enamel applied over glass and bare metal, but also the color standard of the comparative topcoat enamel, indicating that the proportion of nickel soap in the Example 1 composition provides no significant color contribution. Non-uniformity and discoloration in the comparative panel is attributed to bleed-through of uncured undercoat into the wet topcoat enamel.

In another series of tests, the Example 1 topcoat enamel composition and the comparative topcoat enamel which is free of the nickel soap are blended proportionately to provide compositions having a content of the nickel octoate soap equivalent to 0.025%, 0.05% and 0.075% of nickel based on the weight of the coating composition. Compositions having a nickel soap content equivalent to 0.15%, 0.20%, 0.25%, 0.3% and 0.5% of nickel on the indicated basis are prepared by blending appropriate proportions of the nickel octoate soap solution into the Example 1 topcoat enamel composition which already contains 0.1% of nickel as the octoate soap.

Test panels are prepared by spraying these respective topcoat enamels and the comparative topcoat enamel over Bonderized sheet steel having a superficially dry, uncured coating of the primer-surfacer of Example 1 and then processing the composite finish as described hereinbefore. No significant improvement is detected at the soap level of 0.025% nickel. Although a nickel soap level of 0.05% nickel exhibits an advantageous improvement, this proportion of nickel soap in the Example 1 topcoat formulation does not completely remedy the bleed-through condition. There is no detectable bleed-through at the soap level of 0.075% nickel and higher levels. The color contribution of the nickel soap to the white topcoat enamel of Example 1 is readily detected at the soap level of 0.25% nickel and is more significant at soap levels of 0.3% nickel and higher. Nickel octoate soap levels higher than 0.1% nickel in this series of tests offer no significant advantage over the 0.1% nickel level in reference to inhibiting bleed-through in the particular combination of the undercoat and the topcoat of Example 1. The soap content preferably is in the range of 0.075% to about 0.2% nickel equivalent.

In another series of tests, the topcoat composition of Example 1 is sprayed at a coating thickness ranging from 0.5 mil to 2 mils over the Example 1 primer-surfacer uncured wtih the respective panels having the composite coating heat-cured for 30 minutes at temperatures of 225° F., 250° F., and 325° F., and 60 minutes at 210° F. Included in these processing conditions is the additional variable of applying the topcoat wet over the uncured undercoat 1, 5, 10, 30 and 60 minutes, and 24 hours after application of the primer-surfacers applied at a dry coating thickness of about 0.5, 1 and 2 mils.

The resulting test panels having the cured composite coating of the undercoat and topcoat compositions of Example 1 all exhibit freedom from primer bleed-through under the indicated processing conditions which in turn do not remedy the bleed-through of the comparative composite coating. When the comparative topcoat is applied over the primer-surfacer precured by heating for 30 minutes at 300° F. and the superimposed topcoat is cured by heating for 30 minutes at 300° F., the resulting cured composite coating exhibits freedom from undercoat bleed-through.

In still another series of tests, compositional variations in the organic film-forming components of the Example 1 topcoat formulation are evaluated: (a) Coconut oil-modified glyceryl phthalate alkyd resin of comparable oil length is substituted for the indicated castor oil-modified alkyd resin. (b) The indicated castor oil-modified alkyd resin is increased in an amount sufficient to replace the indicated coconut oil-modified alkyd resin. (c) The indicated coconut oil-modified alkyd resin having paratertiary-butyl benzoic acid modification is replaced with a 37% oil length coconut oil-modified glyceryl phthalate alkyd resin. (d) A 36% oil length glyercyl phthalate alkyd resin having a mixture of approximately equal weight proportions of coconut oil and castor oil as the modifying fatty acids components of the alkyd resin is substituted for the total weight of the indicated coconut oil-modified alkyd resin and castor oil-modified alkyd resin. (e) A 48% oil length hydrogenated castor oil-modified glyceryl phthalate alkyd resin is substituted for the indicated castor oil-modified alkyd resin. (f) A 38% cottonseed oil fatty acid modified glyceryl phthalate alkyd resin having an acid number of about 12 and a hydroxyl content equivalent to about 10% excess glycerol is substituted for the indicated combination of coconut oil-modified alkyd resin and castor oil-modified alkyd resin. (g) The butanol-modified urea/formaldehyde resin is substituted for the indicated butanol-modified melamine/formaldehyde resin to provide the entire content of the aminoplast coating resin. (h) The butanol-modified melamine/formaldehyde resin is substituted for the indicated butanol-modified urea/formaldehyde resin. (i) Butanol-modified benzoguanamine/formaldehyde resin is substituted for the indicated combined content of urea/formaldehyde resin and melamine/formaldehyde resin. Results of evaluation of topcoat formulations having these indicated variations in composition show no significant deviation from the performance of the Example 1 topcoat composition in reference to inhibition of bleed-through of the uncured undercoat.

In a further series of tests, the nickel octoate (caprylate) at 0.1% nickel level in the Example 1 topcoat formulation is replaced with an equivalent proportion of: (j) nickel soap of 2-ethylhexoic acid, (k) nickel soap of pelargonic acid, (l) nickel soap of lauric acid, (m) nickel soap of coconut oil fatty acids, (n) nickel naphthenate and (o) nickel soap of rosin acids, all of these soaps having excess soap-forming acid in the range of 10% to 30% of the stoichiometric amount and being in solution in high solvency aromatic hydrocarbon solvent. None of the resulting cured composite coatings exhibit undercoat bleed-through in consequence of the nickel soap substitution.

In a still further series of evaluations, nickel octoate soap is blended with the liquid primer-surfacer composition of Example 1 in the respective equivalent proportions of 0.05%, 0.1%, 0.2% and 0.3% nickel based on the weight of the composition, such proportions of nickel soap being effective in the superimposed topcoat. Panels are primed, as previously described, with the respective soap-modified primer-surfacer compositions and the comparative topcoat composition, unmodified with nickel soap, is superimposed over the respective uncured primer-surfacers and the resulting composite coatings having nickel soap only in the undercoat are cured by heating for 30 minutes at 300° F. A second series of panels is prepared and processed under the same conditions except that the Example 1 topcoat composition containing nickel soap is superimposed over the undercoat containing nickel soap. The resulting composite coatings having the Example 1 topcoat in the combination is free from undercoat bleed-through. The comparative composite coatings having no nickel soap in the superimposed topcoat exhibit undercoat bleed-through although nickel soap is present in the undercoat.

EXAMPLE 2

| Primer-formulation.—First portion: | Parts by weight |
|---|---|
| Soya alkyd resin A—55% | 18 |
| Soya alkyd resin E—53% | 25 |
| Soya lecithin solution—50% in hydrocarbon solvent | 5 |
| Cresol inhibitor solution—10% in hydrocarbon solvent | 3 |
| Xylol—Commercial 10° | 59 |
| Hydrocarbon solvent 3 | 108 |
| Barytes | 157 |
| Gilder's whiting | 95 |
| Talc HO | 23 |
| Zinc oxide | 44 |
| Zinc chromate | 18 |
| Titanium dioxide | 32 |
| Lamp black | 3 |
| Second portion: | |
| Soya alkyd resin E—53% | 329 |
| Butanol-modified urea/formaldehyde resin—60% in butanol | 37 |
| Third portion: | |
| Hydrocarbon solvent 3 | 26 |
| Mineral spirits | 18 |
| | 1000 |

Soya alkyd resin E is a 50% oil length soya oil-modified pentaerythritol phthalate alkyd resin, the content of glycerol being provided by the soya oil. At 53% concentration in 60/40 weight mixture of V. M. & P. naphtha and commercial 10° xylol, the resin solution is characterized by a viscosity of about Z–1 at 25° C. The resin is characterized by an acid number of about 4 and the hydroxyl content is equivalent to about 8% of pentaerythritol. The V. M. & P. naphtha has a boiling range of 100° to 163° C.

Except for pigmentation differences and solvent variations, all the remaining components of this primer formulation are the same as described for the primer-surfacer formulation of Example 1.

The primer is prepared by the same general technique as described for the preparation of the primer-surfacer of Example 1. The resulting primer composition is slightly lower in viscosity than the described primer-surfacer and is ordinarily thinned in the proportion of 100 parts of primer and 5 to 10 parts of toluol, xylol or hydrocarbon solvent 3 for spray application.

This Example 2 primer composition is applied to a Bonderized sheet steel panel of the type used in truck body panels at a dry coating thickness of about 1 mil and, after a flash dry of about 2 minutes at an ambient temperature of about 70° F., the Example 1 topcoat composition is applied by wet spraying to the coating of uncured primer to provide an additional dry coating thickness of about 1.5 mils. After drying for about 15 minutes at an ambient temperature of about 70° F., the composite of primer and topcoat is cured by heating for 30 minutes at 300° F. A comparative panel is prepared under the same conditions using the comparative topcoat composition free of nickel soap described in Example 1. The comparative panel exhibits primer bleed-through into the topcoat and the test panel having the composite coating containing nickel soap in the topcoat is free of primer bleed-through.

In another series of tests, compositional variations in the Example 2 primer formulation are evaluated in reference to the effect on primer bleed-through by: (a) replacing the indicated soya oil-modified alkyd resins with other drying oil-modified alkyd resins ordinarily used in primer and primer-surfacer formulations, e.g., linseed oil-modified alkyd resin and tall oil fatty acid-modified alkyd resin, (b) substituting butanol-modified melamine/formaldehyde resin for the butanol-modified urea/formaldehyde resin, (c) eliminating the indicated butanol-modified urea/formaldehyde resin, (d) individually eliminating the respective pigments. With these compositional variations, the comparative topcoat composition, which is free of nickel soap, superimposed on the uncured primer exhibits primer bleed-through in the resulting cured composite coating. The Example 1 topcoat enamel containing 0.1% of nickel as nickel octoate soap superimposed over the respective primer variations as described above exhibits no primer bleed-through in the resulting cured composite coatings.

I claim:
1. A heat-curable coating composition comprising, as the essential organic film-forming components thereof, 50–97 parts of a fatty acid-modified alkyd resin and 50–3 parts of a lower alkanol-modified aminoplast coating resin condensate of formaldehyde with at least one member of the group consisting of urea melamine and benzoguanamine, in solution in a mutual solvent therefor comprising a hydrocarbon solvent, and a hydrocarbon-soluble nickel soap in an effective small proportion of at least about 0.05% based on the weight of the coating composition and sufficient to inhibit vehicle bleed-through when said coating composition is applied as a topcoat directly over an uncured undercoat comprising a drying oil-modified alkyd resin and paint pigment, said uncured undercoat being characterized as normally exhibiting vehicle bleeding into said superimposed wet topcoat in the absence of said nickel soap, said coating composition containing 3–50 parts aminoplast resin per 100 parts alkyd resin/aminoplast resin combination.

2. A coating composition of claim 1 having said nickel soap present in an effective proportion equivalent to from about 0.075% to about .3% of nickel metal based on the weight of the coating composition, said nickel soap having a content of soap-forming acid in the range of from about the stoichiometric amount up to about 50% excess of the stoichiometric amount combined with the nickel.

3. A coating composition of claim 2 wherein said nickel soap is the soap of at least one $C_6$ to $C_{18}$ aliphatic monocarboxylic acid composed of carbon, hydrogen and oxygen atoms.

4. A coating composition of claim 3 wherein said nickel soap is the soap of at least one $C_6$ to $C_{12}$ saturated aliphatic monocarboxylic acid, the proportion of said soap-forming acid being from 5% to 30% stoichiometric excess.

5. A coating composition of claim 4 wherein said soap consists essentially of nickel octoate.

6. A coating composition of claim 1 wherein said fatty acid-modified alkyd resin is at least one non-drying oil fatty acid-modified alkyd resin present and 15–40 parts aminoplast resin is present per 100 parts total weight of said alkyd resin and said aminoplast coating resin.

7. A coating composition of claim 6 wherein said alkyd resin component includes a mixture of modifying fatty acid carboxylate substitutents in the relative proportions of from 0.33 to 3 parts of castor glyceride oil per part of coconut glyceride oil, the oil length modification of the alkyd resin component being in the range of 20% to 50% by weight.

8. A heat-curable coating composition comprising, as the essential organic film-forming material thereof, 60 to 85 parts of an alkyd resin component consisting essentially of a mixture of coconut oil-modified alkyd resin and castor oil-modified alkyd resin in the relative proportions of 0.4 to 1.5 parts of modifying castor glyceride oil per part of coconut glyceride oil at an oil length in the range of from about 25% to about 45% and 40 to 15 parts of an alkanol-modified aminoplast coating resin component comprising a mixture of about 50% to 80% of a butanol-modified urea/formaldehyde resin and 50% to 20% of a butanol-modified melamine/formaldehyde resin based on the weight of the aminoplast resin mixture, said alkyd resins and aminoplast resins being in solution in a mutual solvent consisting essentially of at least one aromatic hydrocarbon solvent and butanol, paint pigment, and a proportion of nickel octoate soap equivalent to from about 0.075% to about 0.3% of nickel based on the total weight of the coating composition, said soap having a content of soap-forming saturated aliphatic monocarboxylic acid in the proportion of from 5% to 30% in excess of the stoichiometric amount, said parts being based on 100 parts total weight of the mixture of alkyd resins and aminoplast resins.

9. A method of inhibiting vehicle bleed-through of uncured primer composition consisting essentially of drying oil fatty acid-modified alkyd resin and paint pigment into a superimposed heat-curable topcoat composition comprising 60–85 parts of a non-drying oil fatty acid-modified alkyd resin and 40–15 parts of a lower alkanol-modified aminoplast coating resin per 100 parts of alkyd resin/aminoplast resin combination, in solution in a mutual solvent comprising an aromatic hydrocarbon solvent comprising the steps of: (a) blending with said liquid topcoat composition a hydrocarbon-soluble nickel soap in an amount to provide 0.75% to 0.3% of nickel based on the weight of the liquid topcoat composition; (b) superimposing said soap-modified topcoat composition over a layer of said uncured, curable primer; and (c) heat-curing the composite finish of said primer and said heat-curable topcoat under curing conditions equivalent to heating for 30 minutes at a temperature in the range of from about 225° F. to about 325° F., said soap being a hydrocarbon-soluble nickel soap of a substantially water-insoluble aliphatic monocarboxylic acid having at least 6 carbon atoms per molecule and said soap having a content of said acid in the proportions ranging from the stoichiometric amount up to 50% excess of the stoichiometric amount.

10. The method of claim 9 wherein said nickel soap is the soap of a $C_6$ to $C_{12}$ saturated aliphatic monocarboxylic acid having said soap-forming acid present in a proportion of from about 5% to 30% in excess of the stoichiometric amount.

11. As an article of manufacture a sheet metal substrate having as a protective composite finish thereon
   (1) an uncured primer layer consisting essentially of a heat-curable organic film-forming coating vehicle and paint pigment,
   (2) a wet, as applied, topcoat layer comprising a heat-curable aminoplast coating resin and a compatible plasticizing oil-modified alkyd resin in the weight ratio of about 5–50/95–50, respectively, in a hydrocarbon solvent, and a hydrocarbon-soluble nickel soap in an amount to provide at least 0.05% nickel based on the weight of the topcoat; said uncured primer layer normally exhibiting vehicle bleed-through into said wet topcoat layer in the absence of said nickel soap.

12. An article of claim 11 in which the protective composite finish is heat-cured.

13. An article of claim 11 in which the primary layer consists essentially of a drying oil fatty acid-modified alkyd resin and paint pigment and the topcoat layer consists essentially of a non-drying oil fatty acid-modified alkyd resin, a lower alkanol-modified aminoplast coating resin, paint pigment, an aromatic hydrocarbon solvent for the organic film-forming components present and a hydrocarbon-soluble nickel soap in an amount to provide at least 0.05% nickel based on the weight of the topcoat.

14. An article of claim 13 in which the protective composite finish is heat cured.

15. An article of claim 11 wherein said primer layer consists essentially of a soya oil-modified alkyd resin, a butanol-modified urea/formaldehyde coating resin, and non-bleeding paint pigment consisting essentially of inorganic oxide pigment, and said topcoat layer consists essentially of coconut oil-modified alkyd resin, castor oil-modified alkyd resin, butanol-modified urea-formaldehyde resin, butanol-modified melamine/formaldehyde resin, paint pigment and a small effective proportion of nickel soap of a $C_6$ to $C_{12}$ saturated aliphatic monocarboxylic acid having said soap-forming acid present in a proportion of from about 5% to 30% in excess of the stoichiometric amount, curing of the composite coating being effected by heat under conditions equivalent to 30 minutes at a temperature in the range of 225° F. to 325° F.

16. An article of claim 15 wherein said nickel soap is the soap of a $C_8$ saturated aliphatic monocarboxylic acid and said soap is present in the initial liquid topcoat composition in a proportion equivalent to from 0.075% to 0.3% of nickel based on the weight of the liquid coating composition.

References Cited by the Examiner
UNITED STATES PATENTS

| | | | |
|---|---|---|---|
| 2,528,429 | 10/1950 | Elliott | 106—310 |
| 2,597,865 | 5/1953 | Grenbel | 117—75 XR |
| 2,657,153 | 10/1953 | Russel | 117—72 XR |

RICHARD D. NEVIUS, *Primary Examiner.*